(12) United States Patent
Goetz et al.

(10) Patent No.: US 11,935,090 B1
(45) Date of Patent: *Mar. 19, 2024

(54) SYSTEMS AND METHODS FOR LINKING ATM TO RETAILER TRANSACTION TO PRESERVE ANONYMITY

(71) Applicant: Wells Fargo Bank, N.A., San Francisco, CA (US)

(72) Inventors: Darren M. Goetz, Salinas, CA (US); Dennis E. Montenegro, Concord, CA (US); Alicia Y. Moore, San Ramon, CA (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,568

(22) Filed: Aug. 4, 2022

Related U.S. Application Data (63) Continuation of application No. 16/657,682, filed on Oct. 18, 2019, now Pat. No. 11,410,194.

(51) Int. Cl.
| | |
|---|---|
| *G06Q 30/0234* | (2023.01) |
| *G06K 7/14* | (2006.01) |
| *G06Q 20/04* | (2012.01) |
| *G06Q 20/10* | (2012.01) |
| *G06Q 20/20* | (2012.01) |
| *G06Q 20/32* | (2012.01) |
| *G06Q 20/42* | (2012.01) |
| *G06Q 30/0238* | (2023.01) |

(52) U.S. Cl.
CPC ....... *G06Q 30/0234* (2013.01); *G06K 7/1413* (2013.01); *G06Q 20/0425* (2013.01); *G06Q 20/1085* (2013.01); *G06Q 20/209* (2013.01); *G06Q 20/3274* (2013.01); *G06Q 20/42* (2013.01); *G06Q 30/0238* (2013.01)

(58) Field of Classification Search
CPC .......... G06Q 30/0234; G06Q 20/0425; G06Q 20/209; G06Q 20/42; G06Q 20/1085; G06Q 30/0238; G06Q 20/3274; G06K 7/1413
See application file for complete search history.

(56) References Cited

U.S. PATENT DOCUMENTS

| | | | |
|---|---|---|---|
| 7,024,389 B1 * | 4/2006 | Watkins | G06Q 40/02 705/40 |
| 7,171,370 B2 | 1/2007 | Burke | |

(Continued)

FOREIGN PATENT DOCUMENTS

WO WO-2018/189165 A1 10/2018

*Primary Examiner* — Michael Jared Walker
(74) *Attorney, Agent, or Firm* — Foley & Lardner LLP (57) ABSTRACT

Systems, methods, and apparatuses for providing cash back to a customer from a linked ATM after a purchase transaction are described herein. A customer initiates the transactions using a payment check. A cash back amount is determined and an authentication passcode is created. Cash back information is then transmitted to the linked ATM. The cash back information includes the cash back amount and the authentication passcode. The authentication passcode is then provided to the customer. A cash back transaction is then authenticated using the authentication passcode, and the customer is provided with the cash back amount from the linked ATM.

20 Claims, 5 Drawing Sheets

(56) References Cited

U.S. PATENT DOCUMENTS

| | | | | |
|---|---|---|---|---|
| 7,229,013 B2* | 6/2007 | Ben-Aissa | G06Q 20/341 | 235/380 |
| 7,376,621 B1* | 5/2008 | Ling | G06Q 40/12 | 705/41 |
| 8,301,500 B2* | 10/2012 | Pharris | H04L 63/08 | 705/17 |
| 8,321,344 B2* | 11/2012 | Forsyth | G06Q 20/04 | 705/26.1 |
| 8,494,934 B2 | 7/2013 | Atkinson et al. | | |
| 8,533,120 B2* | 9/2013 | Coyle | G06Q 20/1085 | 705/44 |
| 8,590,787 B1* | 11/2013 | Courtright | G06Q 20/1085 | 235/383 |
| 8,600,882 B2 | 12/2013 | Summerrow et al. | | |
| 8,762,274 B2* | 6/2014 | Bosch | G07F 19/20 | 705/43 |
| 8,769,304 B2* | 7/2014 | Kirsch | G06Q 20/0855 | 713/183 |
| 9,137,242 B2* | 9/2015 | Fang | G06Q 20/4014 | |
| 9,208,505 B1* | 12/2015 | Zhou | G06Q 30/0227 | |
| 9,336,543 B2* | 5/2016 | Wagner | G06Q 20/204 | |
| 9,361,619 B2* | 6/2016 | Varadarajan | G06Q 20/405 | |
| 9,536,240 B2* | 1/2017 | Raja | G07F 19/203 | |
| 9,928,497 B2* | 3/2018 | Lam | G06Q 20/347 | |
| 10,121,129 B2* | 11/2018 | Kalgi | G06Q 20/386 | |
| 10,176,466 B2* | 1/2019 | Block | G06Q 20/042 | |
| 2001/0032878 A1* | 10/2001 | Tsiounis | G06Q 20/18 | 235/379 |
| 2007/0214086 A1* | 9/2007 | Homoki | G06Q 20/042 | 705/45 |
| 2008/0195541 A1* | 8/2008 | Battaglini | G06Q 40/02 | 705/43 |
| 2009/0012901 A1* | 1/2009 | Singh | G06Q 20/40 | 705/67 |
| 2009/0070260 A1* | 3/2009 | Flitcroft | G06Q 20/3552 | 705/41 |
| 2011/0055084 A1* | 3/2011 | Singh | G06Q 20/1085 | 455/414.1 |
| 2011/0281630 A1* | 11/2011 | Omar | H04L 63/105 | 463/25 |
| 2012/0047070 A1* | 2/2012 | Pharris | G06Q 20/326 | 705/42 |
| 2012/0158528 A1* | 6/2012 | Hsu | G06Q 20/322 | 705/16 |
| 2012/0221421 A1* | 8/2012 | Hammad | G06Q 10/00 | 705/16 |
| 2012/0254027 A1 | 10/2012 | Kanngard | | |
| 2012/0330769 A1* | 12/2012 | Arceo | G06Q 20/4014 | 455/411 |
| 2013/0138571 A1* | 5/2013 | Vassilev | G06Q 20/3229 | 705/16 |
| 2013/0173403 A1 | 7/2013 | Grigg et al. | | |
| 2013/0317984 A1 | 11/2013 | O'Leary et al. | | |
| 2014/0040147 A1* | 2/2014 | Varadarajan | G06Q 20/4016 | 713/168 |
| 2014/0100973 A1* | 4/2014 | Brown | G06Q 20/322 | 705/17 |
| 2014/0201075 A1* | 7/2014 | King | G06Q 20/326 | 705/42 |
| 2014/0310167 A1* | 10/2014 | Meyer | G06Q 20/04 | 705/40 |
| 2014/0358783 A1* | 12/2014 | Mansur | G06Q 20/10 | 705/44 |
| 2015/0088746 A1* | 3/2015 | Hoffman | G06Q 20/40145 | 705/44 |
| 2015/0103371 A1* | 4/2015 | Bubbio | G06Q 20/3224 | 358/1.15 |
| 2015/0170473 A1* | 6/2015 | Hematji | G06Q 20/4012 | 463/25 |
| 2015/0178732 A1* | 6/2015 | Laracey | G06Q 20/3274 | 235/379 |
| 2015/0269542 A1* | 9/2015 | Katz | G06Q 20/10 | 705/44 |
| 2016/0005008 A1* | 1/2016 | Kumar | G06Q 20/40 | 705/42 |
| 2016/0034875 A1* | 2/2016 | Stevens | G06Q 20/10 | 705/72 |
| 2016/0078445 A1* | 3/2016 | Einhorn | G06Q 20/325 | 705/44 |
| 2016/0098706 A1* | 4/2016 | Ling | G06Q 20/10 | 705/41 |
| 2016/0162882 A1* | 6/2016 | McClung, III | G06Q 20/352 | 705/41 |
| 2016/0283940 A1 | 9/2016 | Streuter et al. | | |
| 2016/0328692 A1* | 11/2016 | Camps | G06Q 20/3223 | |
| 2016/0364729 A1* | 12/2016 | Ruparelia | G06Q 20/1085 | |
| 2017/0091765 A1* | 3/2017 | Lloyd | G06Q 20/321 | |
| 2017/0278080 A1* | 9/2017 | Kruszka | G06Q 20/4037 | |
| 2017/0308896 A1* | 10/2017 | Wolovitz | G06Q 30/06 | |
| 2017/0330188 A1* | 11/2017 | Canh | G06Q 20/40145 | |
| 2018/0012147 A1* | 1/2018 | Hammad | G06Q 10/00 | |
| 2018/0025334 A1* | 1/2018 | Pourfallah | G06Q 20/14 | 705/41 |
| 2018/0082283 A1* | 3/2018 | Sharma | G06Q 20/42 | |
| 2018/0205474 A1* | 7/2018 | Rae | H04H 60/27 | |
| 2018/0260838 A1 | 9/2018 | New et al. | | |
| 2018/0276660 A1 | 9/2018 | Ansari et al. | | |
| 2018/0285843 A1* | 10/2018 | Chaturvedi | G07F 19/211 | |
| 2018/0330367 A1 | 11/2018 | Sharma | | |
| 2019/0164161 A1* | 5/2019 | Sultan | G06Q 20/4012 | |

* cited by examiner

SYSTEMS AND METHODS FOR LINKING ATM TO RETAILER TRANSACTION TO PRESERVE ANONYMITY

CROSS-REFERENCE TO RELATED APPLICATIONS

This application is a continuation of U.S. patent application Ser. No. 16/657,682, titled "SYSTEMS AND METHODS FOR LINKING ATM TO RETAILER TRANSACTION TO PRESERVE ANONYMITY," filed on Oct. 18, 2019, which is incorporated herein by reference in its entirety and for all purposes.

TECHNICAL FIELD

The present application relates to providing cash back to a customer. More particularly, the present application relates to systems and methods for providing cash back to a customer paying for goods or services using a payment check.

BACKGROUND

Many retailer and service provider locations are configured to provide cash back to customers. In some instances, a customer may provide a large bill cash amount (e.g., a $100 bill) or a payment check, which may be worth more than the total cost of their purchase. Accordingly, the retailer or service provider will determine the difference and provide the customer with cash back. In some cases, a customer may request a cash back amount to be added to their credit or debit card transaction at a retailer. In many instances, retailers and service providers that are set up to provide cash back have designated cash back limits (e.g., $200, $400, $500). Thus, if a customer attempts to purchase goods or services with a payment check that is too large, they may be denied from completing their intended transaction.

SUMMARY

One example embodiment relates to method for providing cash back to a customer from a linked automated teller machine (ATM) after a purchase transaction. The method comprises initiating, by the customer, the purchase transaction using a payment check. The method further comprises determining, by a provider computing system, a cash back amount. The method further comprises creating, by the provider computing system, an authentication passcode. The method further comprises transmitting, by the provider computing system, cash back information to the linked ATM, the cash back information including the cash back amount and the authentication passcode. The method further comprises providing the authentication passcode to the customer. The method further comprises authenticating, by the linked ATM, a cash back transaction upon entry of the authentication passcode into the linked ATM by the customer. The method further comprises, upon authentication of the cash back transaction, providing, by the linked ATM, the cash back amount to the customer.

Another example embodiment relates to a method for providing cash back to a customer from a linked ATM after a purchase transaction at a point of sale location. The method comprises initiating, by the customer, the purchase transaction using a payment check. The method further comprises determining, by a point of sale computing system associated with the point of sale location, a cash back amount. The method further comprises determining, by the point of sale computing system, whether the cash back amount is above a cash back threshold. Upon determining that the cash back amount is above the cash back threshold, the method further comprises transmitting, by the point of sale computing system, a cash back request to a provider computing system, the cash back request including a cash back amount. The method further comprises creating, by the provider computing system, an authentication passcode. The method further comprises transmitting, by the provider computing system, cash back information to the linked ATM, the cash back information including the cash back amount and the authentication passcode. The method further comprises providing the authentication passcode to the customer. The method further comprises authenticating, by the linked ATM, a cash back transaction upon entry of the authentication passcode into the linked ATM by the customer. The method further comprises, upon authentication of the cash back transaction, providing, by the linked ATM, the cash back amount to the customer.

Another example embodiment relates to a linked ATM system comprising a network, a provider computing system, and an ATM. The provider computing system is associated with a provider and comprises a network interface and a processing circuit. The network interface is structured to facilitate data communication via the network. The processing circuit comprises a processor and memory. The processing circuit is structured to receive a cash back request from a point of sale computing system via the network, the cash back request including a cash back amount. The processing circuit is further structured to create an authentication passcode. The processing circuit is further structured to transmit the authentication passcode and the cash back amount to an ATM associated with the provider. The processing circuit is further structured to provide the authentication passcode to a customer. The ATM is configured to dispense the cash back amount to the customer upon entry of the authentication passcode by the customer.

These and other features, together with the organization and manner of operation thereof, will become apparent from the following detailed description when taken in conjunction with the accompanying drawings.

DETAILED DESCRIPTION

Referring generally to the figures, systems and methods for linking an ATM to a retailer transaction are shown and described. The linkage between the ATM and the retailer transaction allows a customer to receive cash back resulting from the retailer transaction from the linked ATM. By providing cash back from a linked ATM instead of from the retailer point-of-sale (POS), the customer may feasibly receive significantly larger amounts of cash back than compared to normal cash back limits set at retailer and service provider locations. Further, the systems and methods allow for customers to have a first portion of a large payment check (e.g., an employment paycheck and/or a bonus check) go toward paying for a purchase at the retailer and to receive the second portion, or remainder, of the large payment check value back in cash (i.e., physical currency) from the linked ATM.

The embodiments of the linked ATM system and associated mobile client applications described herein improve current computing systems and payment systems by performing certain steps that cannot be done by conventional computing systems or human actors. For example, the linked ATM system and associated mobile client applications allow a customer to pay for a purchase using a large payment check, and to receive the remainder of the large payment check value back in cash. The large payment check may be larger than a normal cash back limit at a point of sale location where the customer is making the purchase. In some instances, this may allow the customer to effectively cash a large payment check, such as an employment paycheck or a bonus check, without having to enter a location of or have an account associated with a provider (e.g., a financial institution). This may allow the customer to remain anonymous (or largely anonymous) to the provider associated with the linked ATM.

In some instances, underbanked individuals (i.e., individuals having few to no accounts associated with financial institutions) are underbanked for a variety of reasons. For example, some underbanked individuals may wish to remain anonymous to financial institutions. Traditionally, this may result in underbanked individuals taking their employment paychecks, other large checks, or various other payment sources (electronic benefit transfer (EBT) checks, cards, or other payout methods) to a check cashing business location to receive the associated cash value. However, these check cashing locations typically charge a premium to cash checks for customers. For example, check cashing locations may charge a percentage-based premium (e.g., 5%, 10%, 15%) to cash customers' checks. Regardless, largely for lack of a better option, customers continue to pay these premiums to be able to remain anonymous (or largely anonymous) to traditional providers and/or due to the fact that they do not hold accounts with a provider.

Accordingly, the systems and methods provided herein benefit customers, point of sale (e.g., retailer and/or service provider) locations, and providers (e.g., financial institutions). For example, the customers receive cash back for large paychecks without inducing a significant charge. Further, point of sale locations may incorporate this large check cash back option, and this may provide an additional marketing point to bring potential customers into the point of sale location. For example, a customer who otherwise does not shop, or shops infrequently, at the point of sale location may choose to go to the point of sale location to use the large check cash back option, which may result in additional sales for the point of sale location. Further still, providers may benefit from providing the large check cash back option, because point of sale locations who otherwise would not use the provider as an ATM provider may choose to use the provider as their ATM provider to allow for their customers to have the large check cash back option.

The systems and methods described herein additionally improve various interactions between customers, POS locations, and providers. For example, by providing cash back through the linked ATM instead of the POS location, check-out wait time associated with counting and/or providing cash back to customers at the POS location may be significantly reduced or eliminated. As such, the POS location may more efficiently process customer transactions, thereby decreasing wait times and improving customer service speeds. Further, having the linked ATM cash back option available, POS locations may set significantly lower POS cash back thresholds (as compared to traditional POS cash back thresholds), above which cash back is provided from the linked ATM instead of the POS location. Accordingly, POS locations may reduce an amount of cash needed on-site, as well as a frequency of drawer refills, change orders, and various other cash-related tasks, thereby reducing the costs associated with the storing and handling of cash on-site. Further still, because of the reduction of cash needed on-site by POS locations, providers (e.g., financial institutions) may benefit from a reduced number of cash exchanges and/or drop-offs required at the POS locations, thereby reducing the costs associated with POS location cash exchanges and/or drop-offs.

Figure 1:
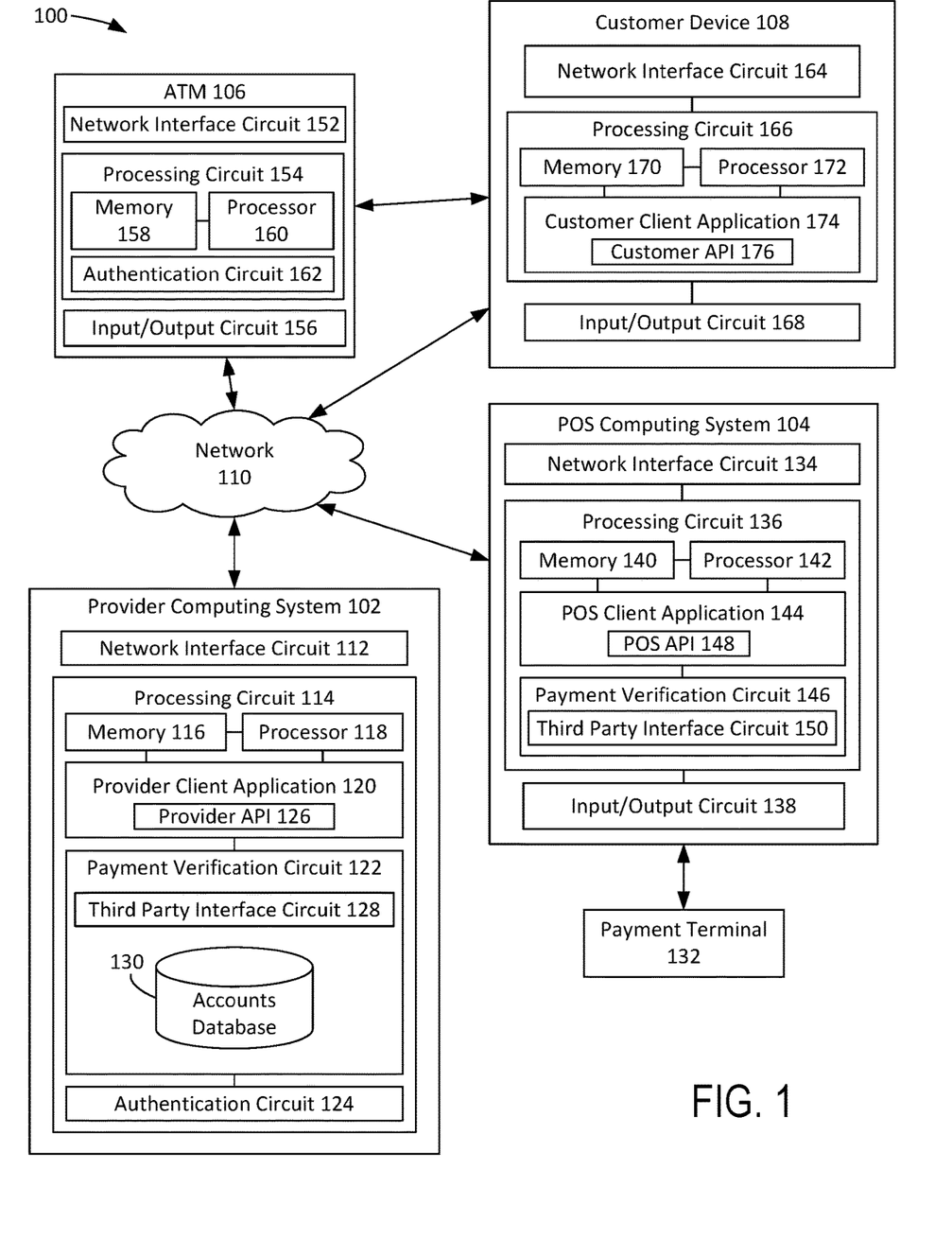
FIG. 1 is a diagram of a linked. ATM system, according to an example embodiment.

Referring now to FIG. 1, a block diagram of a linked ATM system 100 is shown, according to an example embodiment. The linked. ATM system 100 includes, among other systems, a provider computing system 102, a point of sale (POS) computing system 104, an ATM 106, and in some cases, a customer device 108. The ATM 106, the provider computing system 102, the POS computing system 104, and the customer device 108 may communicate directly or through a network 110, which may include one or more of the Internet, cellular network, Wi-Fi, Wi-Max, a proprietary banking network, a proprietary retail or service provider network, or any other type of wired or wireless network.

The provider computing system 102 is operated by a provider, which is an entity that facilitates the transactions occurring at the ATM 106, as well as the maintenance, repairs, and overall operation of the ATM 106. In some embodiments, the provider computing system 102 also facilitates various types of transactions between the POS computing system 104, the ATM 106, and/or the customer device 108, and between the POS computing system 104 and/or customer device 108 and various other entities. As such, the provider computing system 102 may act as an intermediary computing system between the POS computing system 104, the ATM 106, and/or the customer device 108. In some embodiments, the provider computing system 102 manages the debit and/or credit card held by a user requesting funds from the ATM 106. For example, the provider may be a bank, credit union, a payment services company, or other similar entities. The provider computing system 102 includes, among other systems, a network interface circuit 112 and a processing circuit 114. The network interface circuit 112 is structured to enable the provider computing system 102 to exchange data over network 110.

The processing circuit 114 includes a memory 116, a processor 118, a provider client application 120, a payment verification circuit 122, and an authentication circuit 124. The memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 118 and include computer code or instructions for executing one or more processes described herein. The processor 118 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116. One such application may be the provider client application 120.

The provider client application 120 is structured to manage various elements of the linked ATM system 100 to allow a customer that is using a check to pay for a purchase transaction at a point of sale (POS) location (e.g., a retailer or service provider location) to receive cash back using a linked ATM (e.g., the ATM 106). For example, the provider client application 120 is configured to receive a cash back request from the POS computing system 104 and/or the customer device 108, the cash back request including a cash back amount and payment check information. The provider client application 120 is then configured to verify the payment check information using the payment verification circuit 122. The provider client application 120 is then configured to transmit an authentication passcode created by the authentication circuit 124 to the POS computing system 104 and/or the customer device 108. The provider client application 120 is then configured to transmit the authentication passcode to the ATM 106, along with the cash back amount, to allow the customer to securely interact with the ATM 106 to receive the cash back amount.

Accordingly, the provider client application 120 is communicably coupled to the POS computing system 104 (e.g., a POS client application 144), the ATM 106 (e.g., an authentication circuit 162), and, in some cases, the customer device 108 (e.g., a customer client application 174). In some embodiments, the provider client application 120 may be incorporated with an existing application in use by the provider computing system 102 (e.g., a mobile banking application). In other embodiments, the provider client application 120 is a separate software application implemented in the provider computing system 102. The provider client application 120 may be downloaded by the provider computing system 102 prior to its usage, hard coded into the memory 116 of the provider computing system 102, or be a web-based interface application such that the provider computing system 102 may provide a web browser to the application, which may be executed remotely from the provider computing system 102.

In this regard, the provider client application 120 may be supported by a separate computing system including one or more servers, processors, network interface circuits, etc. that transmit applications for use to the provider computing system 102. In certain embodiments, the provider client application 120 includes an application programming interface (API) and/or a software development kit (SDK) that facilitate the integration of other applications with the provider client application 120. For example, the provider client application 120 may include an API 126 that facilitates the receipt and/or transmittal of information pertaining to the linked ATM system 100 as described further below.

In some embodiments, the provider client application 120 may be configured to utilize the functionality of the POS computing system 104, the ATM 106, and/or the customer device 108 by interacting with corresponding applications and/or circuits of the POS computing system 104, the ATM 106, and/or the customer device 108. For example, the provider client application 120 may interact with the POS client application 144 of the POS computing system 104 through a POS API 148. Similarly, the provider client application 120 may interact with an authentication circuit 162 of the ATM 106. Further, the provider client application 120 may interact with the customer client application 174 of the customer device 108 through a customer API 176. Accordingly, the provider client application 120 is communicably coupled with the POS computing system 104, the ATM 106, and in some cases the customer device 108 to allow a customer that is using a check to pay for a purchase transaction at a POS location to receive cash back using the ATM 106.

The provider client application 120 is a network-based or web application. Accordingly, the provider computing system 102 includes software and/or hardware capable of implementing a network-based or web application. Further, the provider client application 120 includes software such as HTML, XML, WML, SGML, PHP (Hypertext Preprocessor), CGI, and like languages.

The payment verification circuit 122 is configured to receive a cash back request, verify that a payment check is valid (if necessary), and build a notification indicating that the check is valid. In some instances, the cash back request may include a cash back amount and payment check information. The payment check information may include a payer name, an account number, an issuer name, a routing number, or any other necessary information needed to verify the payment check. In some instances, the payment verification circuit 122 may receive a digital image of the payment check from the customer device 108 and/or the POS computing system 104. The payment verification circuit 122 may be configured to analyze the digital image of the payment check to obtain information about the payment check, similar to a mobile check deposit. The obtained information about the payment check may then be used by the payment verification circuit 122 to verify the payment check. In some instances, the provider computing system 102 may be configured to store the digital image of the payment check in the memory 116. Accordingly, the stored digital image of the payment check may provide additional anti-fraud security to the customer transaction.

As illustrated in FIG. 1, the payment verification circuit 122 is shown, according to an example embodiment. The payment verification circuit 122 is included in, integrated within, or otherwise communicable with the processing circuit 114 of the provider computing system 102. In another embodiment, the payment verification circuit 122 may be included with the POS computing system 104 instead. In still another embodiment, the payment verification circuit 122 may be included partially with the POS computing system 104 and partially with the provider computing system 102. The payment verification circuit 122 includes a third party interface circuit 128 and an accounts database 130. While various circuits, interfaces, and logic with particular functionality are shown, it should be understood that the payment verification circuit 122 includes any number of circuits, interfaces, and logic for facilitating the functions described herein.

The third party interface circuit 128 is configured to communicate with third party service providers (e.g., check verification services) to verify that the payment check is valid. For example, the third party interface circuit 128 may be configured to selectively transmit the payment check information received by the payment verification circuit 122 to a third party service provider. In the instances where the payment verification circuit 122 receives a digital image of the payment check, the third party interface circuit 128 may additionally or alternatively transmit the digital image to the third party provider for verification.

In some instances, the provider associated with the provider computing system 102 may be a financial institution. As such, in some instances, the payment check may be a check provided to the customer by the provider associated with the provider computing system 102 (i.e., the provided is the issuer of the payment check). Accordingly, the provider computing system 102 may have account information pertaining to the payment check stored in the accounts database 130. The accounts database 130 is structured to retrievably store account information pertaining to a plurality of user accounts. The account information may include account holders' names, account numbers, routing numbers, and so on. The accounts database 130 may include non-transient data storage mediums (e.g., local disc or flash-based hard drives, local network servers, and the like) or remote data storage facilities (e.g., cloud servers).

Accordingly, in some instances, the payment verification circuit 122 is configured to verify the payment check based on account information stored within the accounts database 130. That is, the payment verification circuit 122 may determine if the payment check information included in the cash back request and/or obtained from the digital image of the payment check matches account information stored within the accounts database.

The authentication circuit 124 is configured to create or produce an authentication passcode for authenticating a cash withdrawal at the ATM 106. For example, upon verification of the payment check, the authentication circuit 124 may create or produce the authentication passcode and transmit the authentication passcode to the ATM 106 (e.g., the authentication circuit 162) and at least one of the POS computing system 104 and the customer device 108. The authentication passcode may be a one-time passcode (OTP), a bar code, a QR code, a PIN, a time-encoded passcode, or any other suitable passcode capable of authenticating the cash withdrawal at the ATM 106. In some instances, the authentication passcode may be a printable passcode. In some other instances, the authentication passcode may be a display screen that may be transmitted to the customer device 108 that may be subsequently. In either case, the authentication passcode may be a scannable passcode configured to be scanned by the ATM 106, as will be discussed below.

Accordingly, the provider computing system 102 (e.g., the provider client application 120) is configured to receive the cash back request from the POS computing system 104 and/or the customer device 108, verify the payment check, create the authentication passcode, and transmit the transaction information (e.g., the authentication passcode and the cash back amount) to the POS computing system 104, the ATM 106, and/or the customer device 108.

In some instances, the POS computing system 104 may include and/or be communicably coupled to a payment terminal 132 (or a plurality of payment terminals similar to the payment terminal 132). The payment terminal 132 may be an assisted payment terminal (e.g., a payment terminal operated by an employee or worker of the POS location) or a self-checkout payment terminal (e.g., a payment terminal operated by the customer). The payment terminal 132 is configured to receive a purchase transaction request from the customer. The purchase transaction request may include a purchase amount (i.e., a cost of the purchase) and payment check information, and in some instances, a digital image of the payment check. The payment check information may include a payer name, an account number, a routing number, or any other suitable or necessary information needed to verify and/or process the payment check. Accordingly, the payment terminal 132 may be communicably and operably coupled to an imaging device (e.g., a digital camera) to obtain the digital image of the payment check and/or a scanning device (e.g., a check verification scanner) to obtain the payment check information. The POS computing system 104 further includes a network interface circuit 134, a processing circuit 136, and an input/output circuit 138. The network interface circuit 134 is similarly structured to enable the provider computing system 102 to exchange data over network 110.

The processing circuit 136 is structured to allow for a customer to pay for a purchase transaction with a payment check and to receive cash back at the ATM 106. For example, the processing circuit includes a memory 140, a processor 142, a POS client application 144, and a payment verification circuit 146. The memory and the processor 142 are substantially similar to the memory 116 and the processor 118 described above. As such, the POS computing system 104 (e.g., the processing circuit 136) is configured to run a variety of application programs and store associated data in a database of the memory 140. One such application may be the POS client application 144.

The POS client application 144 is structured to provide displays to the POS computing system 104 that enable a user or POS employee to manage interactions with the various elements of the linked ATM system 100. For example, the POS client application 144 may be configured to receive the purchase transaction request from the customer (e.g., through a person-to-person interaction or through the customer device 108), verify a payment check (e.g., using the payment verification circuit 146 or interacting with the provider client application 120), determine the cash back amount, transmit the cash back amount to the provider computing system 102, receive the authentication passcode from the provider computing system 102, and provide the authentication passcode to the customer (e.g., the customer device 108). Accordingly, the POS client application 144 is communicably coupled to the provider computing system 102 (e.g., the provider client application 120) and/or the customer device 108 (e.g., the customer client application 174).

In some embodiments, the POS client application 144 may be incorporated with an existing application in use by the POS computing system 104 (e.g., the provider client application 120, a mobile banking application, a service provider application, etc.). In other embodiments, the POS client application 144 is a separate software application implemented on the POS computing system 104. The POS client application 144 may be downloaded by the POS computing system 104 prior to its usage, hard coded into the memory 140 of the POS computing system 104, or be a web-based interface application such that the POS computing system 104 may provide a web browser to access the application, which may be executed remotely from the POS computing system 104.

In the latter instance, the user (e.g., a POS employee) may have to log onto or access the web-based interface before usage of the application. Further, and in this regard, the POS client application 144 may be supported by a separate computing system including one or more servers, processors, network interface circuits, etc. that transmit applications for use to the POS computing system 104. In certain embodiments, the POS client application 144 includes an application programming interface (API) and/or a software development kit (SDK) that facilitate the integration of other applications with the POS client application 144. For example, the POS client application 144 may include the POS API 148 that facilitates the receipt and/or transmittal of information pertaining to the linked ATM system 100 as described further below.

In some embodiments, the POS client application 144 is configured to utilize the functionality of the provider computing system 102 by interacting with the provider client application 120 through the API 126. Accordingly, the POS client application 144 may be communicably coupled with the provider computing system 102 and the customer device 108 to perform a variety of functions. The POS client application 144 may be a network-based or web application. Accordingly, the POS computing system 104 includes software and/or hardware capable of implementing a network-based or web application. The POS client application 144 includes software such as HTML, XML, WML, SGML, PHP (Hypertext Preprocessor), CGI, and like languages.

The displays presented to the user or POS employee via the POS client application 144 may provide a notification to the user or POS employee that the payment check has been verified. Further, the displays presented to the user may provide a notification including the authentication passcode. In some instances, the POS client application 144 is further configured to provide the authentication passcode to the customer. For example, the POS client application 144 may be communicably and operably coupled to a printing machine, and a printout of the authentication passcode may be provided to the customer. In other embodiments, the POS client application 144 is configured to transmit the authentication passcode to the customer device 108. For example, the POS client application 144 may be configured to transmit a display showing the passcode (e.g., an alphanumeric passcode and/or a scannable barcode) to the customer device 108 (e.g., the customer client application 174). In some other instances, the POS client application 144 is configured to send the passcode to the customer device 108 through an email, an SMS message, or any other suitable messaging method, program, or application.

Although FIG. 1 shows the payment verification circuit 146 as part of the processing circuit 136, in other arrangements the payment verification circuit 146 is embodied as a separate processing circuit. Other arrangements may include more or less circuits without departing from the spirit and scope of the present disclosure. Therefore, those of ordinary skill in the art will appreciate that the present arrangement is not meant to be limiting.

The payment verification circuit 146 is communicably and operably coupled to the provider computing system 102, the ATM 106, the customer device 108, and the payment terminal 132. The payment verification circuit 146 is structured to receive the purchase transaction request from the customer. In some instances, the purchase transaction request may pertain to a physical transaction at the payment terminal 132. In some instances, the purchase transaction request may be received from the customer device 108 (e.g., submitted through the customer client application 174). As alluded to above, the purchase transaction request may include a purchase amount, payment check information, and a digital image of the payment check. The payment verification circuit 146 includes a third party interface circuit 150. While exemplary circuits, interfaces, and logic with particular functionality are shown, it should be understood that the payment verification circuit 146 includes any number of circuits, interfaces, and logic for facilitating the functions described herein.

The third party interface circuit 150 is similarly configured to communicate with third party service providers (e.g., check verification services) to verify that the payment check is valid. For example, the third party interface circuit 150 may be configured to selectively transmit the payment check information received by the payment verification circuit 146 to a third party service provider. In the instances where the payment verification circuit 146 receives a digital image of the payment check, the third party interface circuit 150 may additionally or alternatively transmit the digital image to the third party provider for verification.

Accordingly, in some instances, the POS location may be responsible for verifying the payment check (e.g., using the payment verification circuit 146). In these instances, for example, if a customer pays for a $200 bill with a $1,000 payment check, the POS location may receive the $1,000 from the issuer of the payment check. The POS location may then use the first $200 to pay for the bill, and may transmit the remaining $800 to the provider to be provided to the customer via the ATM 106. Alternatively, in some instances, the provider is responsible for verifying the payment check (e.g., using the payment verification circuit 122). Accordingly, in these instances, if a customer pays for a $200 purchase amount with a $1,000 payment check, the provider may receive the $1,000 from the issuer of the payment check (if the provider is not the issuer). Then, the provider may transmit the first $200 to the POS location to pay for the purchase, and may provide the remaining $800 to the customer via the ATM 106, as described herein. Thus, the POS location and the provider can determine which verification process is appropriate for a given situation. In some instances, the provider computing system 102 or the POS computing system 104 may be configured to verify the payment check using any suitable check verification program or service.

Once the payment check has been verified, the POS client application 144 is configured to determine the cash back amount by comparing the payment check amount (i.e., the value indicated on the payment check) with the purchase amount. For example, if the payment check amount is $1,000 and the purchase amount is $250, the cash back amount would be $750.

The input/output circuit 138 is structured to receive communications from and provide communications to the user or POS employee or worker associated with the POS computing system 104. In this regard, the input/output circuit 138 is structured to exchange data, communications, instructions, etc. with an input/output component of the POS computing system 104. Accordingly, in one embodiment, the input/output circuit 138 includes an input/output device. In another embodiment, the input/output circuit 138 includes communication circuitry for facilitating the exchange of data, values, messages, and the like between an input/output device and the components of the POS computing system 104. In yet another embodiment, the input/output circuit 138 includes machine-readable media for facilitating the exchange of information between an input/output device and the components of the POS computing system 104. In still another embodiment, the input/output circuit 138 includes any combination of hardware components, communication circuitry, and machine-readable media.

For example, in some embodiments, the input/output circuit 138 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 138 provides an interface for the user to interact with various applications (e.g., the POS client application 144) stored on the POS computing system 104. In some instances, the input/output circuit 138 may be configured to display the authentication passcode to the user or POS employee through the local display. In some instances, the input/output circuit 138 may further comprise and/or be communicably coupled to a printing device. Accordingly, in some instances, the authentication passcode may be printed out and provided physically to the customer.

Still referring to FIG. 1, the ATM 106 is shown, according to an example embodiment. The ATM 106 is owned and operated by the provider associated with the provider computing system 102. The ATM 106 is a computing system configured to provide an interface between a user (e.g., the customer) and the provider computing system 102, allowing the user to access information at and perform transactions with the corresponding provider. In various arrangements, the ATM 106 is configured to, among other things, allow a customer to view account balances, purchase stamps, deposit checks, transfer funds, or withdraw funds from a given account in the form of cash. For example, the ATM 106 may include a currency dispenser that is used to dispense currency when the user wishes to perform a cash withdrawal. The ATM 106 may also include a deposit slot that is configured to receive paper currency and checks when the user wishes to make a deposit. The ATM 106 can further include a transaction card slot configured to receive a transaction card inserted by a user.

In some embodiments, the ATM 106 is disposed at a brick and mortar banking facility associated with the provider. In other embodiments, the ATM 106 is a standalone computing terminal (e.g., disposed at an unrelated retail facility, within an office building). For example, in some instances, the ATM 106 may be located at the POS location where the customer has made the transaction, as described herein. In other instances, the ATM 106 may be at a separate location from the POS location, and the customer may go to the separate location to receive the remainder of the payment check value (e.g., the cash back amount described above).

The ATM 106 includes a network interface circuit 152, a processing circuit 154, and an input/output circuit 156. The network interface circuit 152 enables the ATM 106 to exchange data over the network 110. As such, the network interface circuit 152 allows the ATM 106 to exchange data to remote computing devices (e.g., the provider computing system 102, the POS computing system 104, and the customer device 108).

The processing circuit 154 includes a memory 158, a processor 160, and an authentication circuit 162. The memory 158 includes one or more memory devices (e.g., RAM, NVRAM, ROM, Flash Memory, hard disk storage, etc.) that store data and/or computer code for facilitating the various processes described herein. That is, in operation and use, the memory 158 stores at least portions of instructions and data for execution by the processor 160 to control the functionality of the processing circuit 154. Moreover, the memory 158 may be or include tangible, non-transient volatile memory or non-volatile memory. The processor 160 may be implemented as a general-purpose processor, an application specific integrated circuit (ASIC), one or more field programmable gate arrays (FPGAs), a digital signal processor (DSP), a group of processing components, or other suitable electronic processing components.

As illustrated in FIG. 1, the authentication circuit 162 is shown, according to an example embodiment. The authentication circuit 162 is included in, integrated within, or otherwise communicable with the processing circuit 154 of the ATM 106. In another embodiment, the authentication circuit 162 may be included with the provider computing system 102 instead. In still another embodiment, the authentication circuit 162 may be included partially with the ATM 106 and partially within the provider computing system 102. The authentication circuit 162 is configured to receive the authentication passcode from the provider computing system 102. The authentication circuit 162 is also configured to receive the authentication passcode from the customer device 108. The authentication circuit 162 is then structured to compare the authentication passcode received from the provider computing system 102 with the passcode received from the customer device 108. If the two passcodes match, the authentication circuit 162 may indicate to the processing circuit 154 that the payment request has been authenticated. Upon authentication, the processing circuit 154 is configured to provide the cash back amount to the customer.

The input/output circuit 156 includes one or more devices and associated logic configured to allow a user to input and exchange information and interact with the ATM 106. For example, an input aspect of the input/output circuit 156 can include a magstripe reader, a keyboard, a touchscreen, a microphone, a camera, a fingerprint scanner, any user input device engageable with the ATM 106 via a USB, serial cable, and so on. The input/output circuit 156 can further include hardware and associated logic enabling contactless data transfers, for example, using radio frequency identification ("RFID") and/or NFC. For example, the input/output circuit 156 may include and be communicably coupled to an RFID device and/or an NFC device. Similarly, the input/output circuit 156 may include hardware and associated logic enabling the scanning of a barcode. For example, the input/output circuit 156 may include a barcode scanning device (e.g., a UPC code scanner, a QR code scanner, etc.).

In addition, the input/output circuit 156 can include and/or be communicably coupled to a camera to monitor real-time activity surrounding the ATM 106. For example, the camera can record the activity occurring proximate the ATM 106, which can then be analyzed by the various circuits included with the ATM 106 (e.g., the input/output circuit 156). The input/output circuit 156 can also include and/or be communicably coupled to various sensors which are configured to detect movement and proximity of objects near the ATM 106. For example, a motion detector sensor is included with the input/output circuit 156 to detect movement of objects near the ATM 106. In various arrangements, motion detector sensors include, but are not limited to, passive infrared sensors, microwave motion detectors, ultrasonic detectors, proximity sensors, heat detectors, etc., which are used to detect movement proximate the ATM 106. In some arrangements, the sensor and camera can be used in a combined arrangement such that operation of the camera is triggered by the sensor. As such, upon the detection of an object, the sensor can communicate a detection signal to the camera, which begins recording the activity near the ATM 106 in response to the communicated detection. Similarly, in some arrangements, the sensor and the RFID devices and/or the NFC devices can be used in a combined arrangement such that operation of the RFID devices and/or the NFC devices is triggered by the sensor. As such, upon the detection of an object, the sensor can communicate a detection signal to the RFID devices and/or the NFC devices to search for, connect with, and communicate with the customer device 108 to initiate a cash back transaction with the ATM 106.

The input/output circuit 156 may further include a user interface having a display, a speaker, illuminating icons, LEDs, a cash dispenser, a paper (e.g., receipts) dispenser, and so on. Accordingly, the user interface may provide an interface for a user to interact with the ATM 106 to allow the user to request and perform cash back transactions with the ATM 106.

Accordingly, to initiate a cash back transaction with the ATM 106, a user may insert an ATM card into a transaction card slot of the ATM 106. In another embodiment, to initiate a cash back transaction with the ATM 106, a user may approach the ATM 106 with the customer device 108, which may be configured to automatically initiate a cash back transaction after sensing and connecting with the ATM 106 using RFID and/or NFC logic. In yet another embodiment, to initiate a cash back transaction, a user may enter the authentication passcode into the ATM 106. In some instances, the user may enter the authentication passcode using the user interface on the ATM 106. In some instances, the user may instead enter the authentication passcode by scanning a barcode printed on a receipt or from a displayable barcode displayed on the customer device 108. The authentication passcode may be a one-time passcode (OTP), a PIN, a bar code, a QR code, or any other suitable passcode for securing the cash back transaction between the customer and the ATM 106.

The customer device 108 includes any type of computing device that may be used to conduct transactions and/or communicate with the provider computing system 102, the POS computing system 104, and/or the ATM 106. Accordingly, in some arrangements, the customer uses the customer device 108 to communicate various information to and/or from the provider computing system 102, the POS computing system 104, and the ATM 106 over the network 110. In this regard, the customer device 108 may include any wearable or non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), ring, etc. The customer device 108 may also include any type of mobile device including, but not limited to, a phone (e.g., smart phone, etc.), tablet, personal digital assistant, and/or computing devices (e.g., desktop computer, laptop computer, personal digital assistant, etc.).

Still referring to FIG. 1, the customer device 108 includes a network interface circuit 164, a processing circuit 166, and an input/output circuit 168. The network interface circuit 164 enables the customer device 108 to exchange information over the network 110. The processing circuit 166 includes a memory 170, a processor 172, and a customer client application 174. The memory 170 includes one or more memory devices (e.g., RAM, NVRAM, ROM, Flash Memory, hard disk storage, etc.) that store data and/or computer code for facilitating the various processes described herein. That is, in operation and use, the memory 170 stores at least portions of instructions and data for execution by the processor 172 to control the functionality of the processing circuit 166. Moreover, the memory 170 may be or include tangible, non-transient volatile memory or non-volatile memory. The processor 172 may be implemented as a general-purpose processor, an application specific integrated circuit (ASIC), one or more field programmable gate arrays (FPGAs), a digital signal processor (DSP), a group of processing components, or other suitable electronic processing components. As such, the customer device 108 is configured to run a variety of application programs and store associated data in a database of the memory 170. One such application may be the customer client application 174.

The customer client application 174 is structured to provide displays to the customer device 108 that enable the user to manage interactions with the provider computing system 102, the POS computing system 104, and the ATM 106. The customer client application 174 may be used to, among other things, initiate a purchase transaction with the POS computing system 104 (or the provider computing system 102), receive an authentication passcode from the POS computing system 104 (or the provider computing system 102), and provide the authentication passcode to the ATM 106 to authenticate a cash back transaction. Accordingly, the customer client application 174 is communicably coupled to the provider computing system 102 (e.g., the provider client application 120), the POS computing system 104 (e.g., the POS client application 144), and the ATM 106 (e.g., the authentication circuit 162).

In some embodiments, the customer client application 174 may be incorporated with an existing application in use by the provider (e.g., a mobile banking application or a mobile wallet application). In other embodiments, the customer client application 174 is a separate software application implemented on the customer device 108. The customer client application 174 may be downloaded by the customer device 108 prior to its usage, hard coded into the memory 170 of the customer device 108, or be a web-based interface application such that the customer device 108 may provide a web browser to the application, which may be executed remotely from the customer device 108.

In the latter instance, the user may have to log onto or access the web-based interface before usage of the applications. Further, and in this regard, the customer client application 174 may be supported by a separate computing system including one or more servers, processors, network interface circuits, etc. that transmit applications for use to the customer device 108. In certain embodiments, the customer client application 174 includes an API and/or a software development kit (SDK) that facilitate the integration of other applications with the customer client application 174. For example, the customer client application 174 may include the customer API 176 that facilitates the transmittal and receipt of information pertaining to the linked ATM system 100 as described herein.

The displays presented to the user via the customer client application 174 may provide user interfaces to the customer to allow the customer to initiate a purchase transaction. Further, the user interface may allow for the user to receive an authentication passcode and to provide the authentication passcode to the ATM 106. Accordingly, the customer client application 174 may be communicably coupled with the provider computing system 102, the POS computing system 104, and the ATM 106.

The customer client application 174 is a network-based or web application. Accordingly, the customer device 108 includes software and/or hardware capable of implementing a network-based or web application. Further, the customer client application 174 includes software such as HTML, XML, WML, SGML, PHP (Hypertext Preprocessor), CGI, and like languages.

The input/output circuit 168 is configured to exchange information with the user. An input device or component of the input/output circuit 168 allows the user to provide information to the customer device 108, and may include, for example, a mechanical keyboard, a touchscreen, a microphone, a camera, a fingerprint scanner, any user input device engageable with the customer device 108 via a USB, serial cable, Ethernet cable, and so on. An output device or component of the input/output circuit 168 allows the user to receive information from the customer device 108, and may include, for example, a digital display, a speaker, illuminating icons, LEDs, and so on.

Accordingly, the customer may initiate a purchase transaction at the payment terminal 132. That is, the customer may bring goods to the payment terminal 132, and provide the payment check to the payment terminal worker, or into a check verification scanning device of a self-checkout terminal, to pay for the goods. When the payment check is worth more than the cost of the goods, the POS computing system 104 is configured to verify the payment check, and then provide the customer with an authentication passcode. For example, the customer may receive a printed receipt with the authentication passcode printed thereon. Alternatively, or additionally, the customer may receive a displayable passcode on a display of the customer device 108, provided by the customer client application 174. The customer may then take the printed passcode and/or the displayable passcode on the customer device 108 to the ATM 106. The customer may then initiate a cash back transaction with the ATM 106. The customer may enter the authentication passcode into the ATM 106 to authenticate the cash back transaction.

For example, the customer may use a keypad on the ATM 106 to enter the authentication passcode, which may be a PIN or other type of alphanumeric passcode. In some other instances, when the authentication passcode is a scannable passcode (e.g., a UPS code or a QR code), the customer may scan in the authentication passcode using a barcode scanner of the payment terminal 132.

In some other instances, the customer may approach the ATM 106, and the customer device 108 may be configured to automatically connect to the ATM 106 using an RFID device and/or NFC device. Once connected, the customer device 108 may provide a prompt (e.g., provided by the customer client application 174) to the customer asking whether to provide the authentication passcode to the ATM 106. Accordingly, the customer may click on the notification and select to provide the authentication passcode to the ATM 106 to authenticate the cash back transaction. That is, the passcode may be automatically transmitted to the ATM 106 upon the customer clicking on the notification, as will be described below. It will be understood that the authentication passcode transfers between the customer device 108 and the ATM 106 can be achieved in various ways, and the examples provided herein are not meant to be limiting.

Figure 2:
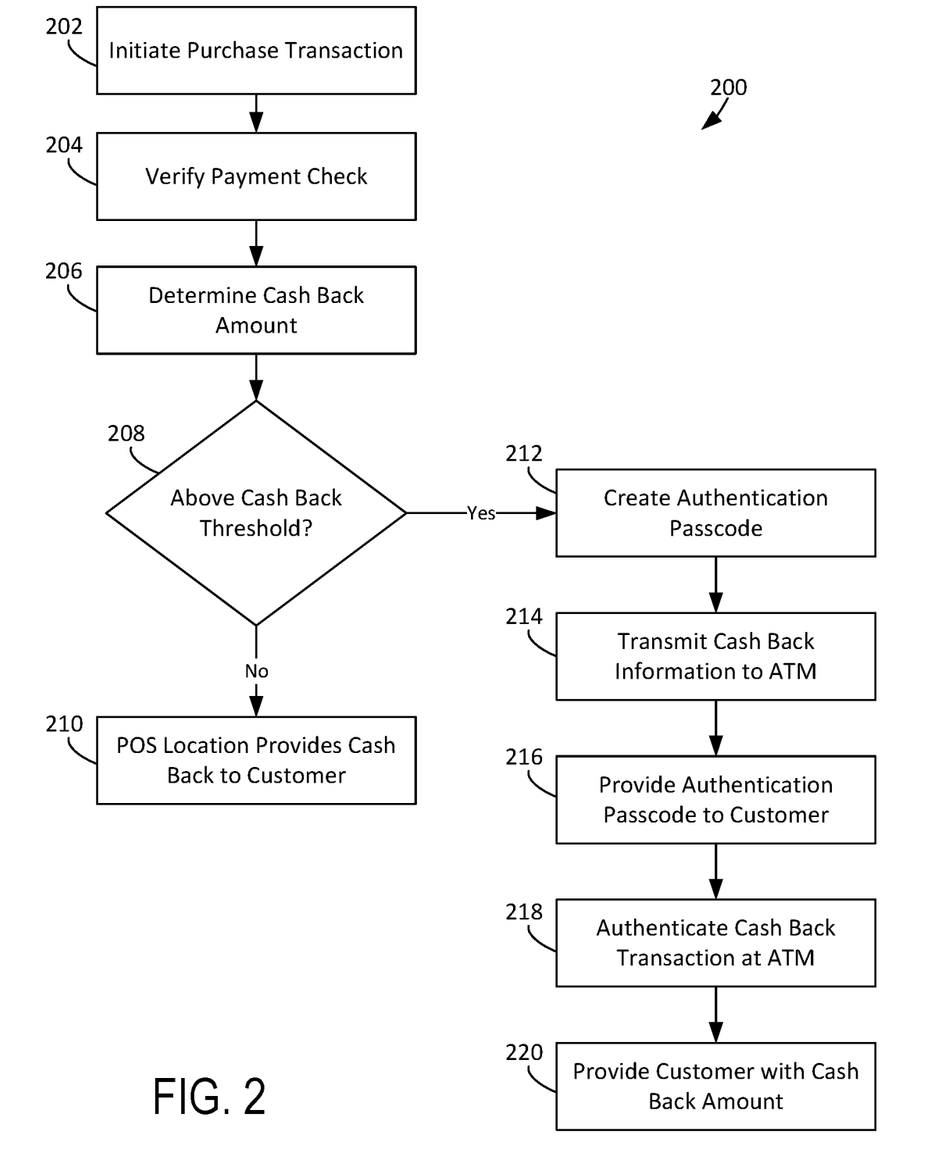
FIG. 2 is a flow diagram of a method of providing a customer with cash back from a linked ATM after a transaction, according to an example embodiment.

Referring to FIG. 2, a flow diagram of a method 200 for providing cash back using a linked ATM to a customer that is using a check to pay for a purchase transaction at a POS location (e.g., a retailer or service provider location) is shown according to an example embodiment. The method 200 may be performed by the linked ATM system 100 described above. In the method 200, the customer first provides a check to the POS location to pay for a purchase transaction and request cash back. The check is then verified, and a cash back amount is determined based on the transaction amount and the check value. The cash back amount is then communicated to the linked ATM using the provider computing system. The customer is then given an authentication passcode to provide to the linked ATM to receive their cash back.

The method begins when a purchase transaction is initiated at step 202. For example, the customer may initiate the purchase transaction at the POS computing system 104 (e.g., the payment terminal 132), as described above. For example, the customer may bring various items (e.g., retail items, products, services orders) to the payment terminal 132 for purchase. In some instances, the customer may instead initiate the purchase transaction using the customer device 108 (e.g., through the customer client application 174). As a payment method, the customer may provide a payment check to the POS computing system 104 to pay for the items for purchase. In some instances, this may include physically handing the payment check to a worker of the POS computing system 104 or inserted the payment check into a check verification scanning device. In other instances, this may include sending a digital image of the check to the POS computing system 104.

In some instances, when the customer is initiating the purchase transaction using the customer device 108, the customer may not physically be at a POS location. The customer may be using an e-commerce application, a bill pay website, or the like. For example, the customer may be paying a water bill, a utility bill, a cable bill, a phone bill, and so on. In some instances, the systems and methods described herein may be accessible by developers through the various APIs 126, 148, 176. Accordingly, in some instances, the customer may initiate the transaction through the customer device 108, without having to visit a physical POS location.

Once the customer has provided the payment check, the linked ATM system 100 verifies the payment check at step 204. In some instances, the POS computing system 104 is configured to verify the payment check using the third party interface circuit 150 of the payment verification circuit 146. For example, the payment verification circuit 146 may receive the purchase transaction request from the customer, including the payment check information and/or the digital image of the payment check, and may use the third party interface circuit 150 to send the payment check information and/or the digital image of the payment check to a third party service provider (e.g., a financial institution or a check verification service) for verification.

Alternatively, the customer device 108 and/or the payment verification circuit 146 of the POS computing system 104 may be configured to send the payment check information and/or the digital image of the payment check to the provider computing system 102 for verification. Accordingly, the payment verification circuit 122 of the provider computing system 102 may receive and analyze the payment check information and/or the digital image to verify the payment check. For example, when the payment verification circuit 122 receives the digital image of the payment check, the payment verification circuit 122 is configured to analyze the digital image to obtain the payment check information. Then, once the payment verification circuit 122 has obtained or received the payment check information, the payment verification circuit 122 may compare the payment check information to various account information stored within the accounts database 130 to verify that the payment check is associated with an account associated with the provider (e.g., a financial institution). If the payment check is not associated with an account associated with the provider, the payment verification circuit 122 is configured to transmit of send the payment check information to a third party using the third party interface circuit 128, as described above, with respect to the payment verification circuit 146 and the third party interface circuit 150.

Once the payment check has been verified, the POS computing system 104 and/or the provider computing system 102 are configured to determine a cash back amount, at step 206. For example, the POS client application 144 and/or the provider client application 120 are configured to determine the cash back amount based on a difference between the purchase amount and the payment check amount.

After determining the cash back amount, the POS computing system 104 and/or the provider computing system 102 may then determine if the cash back amount is above a cash back threshold, at step 208. In some instances, a worker (e.g., an employee, a supervisor, a manager, etc.) at the POS location may enter a cash back threshold using the POS client application 144. The cash back threshold indicates a cash back amount that the POS location is capable of directly providing to the customer. For example, some retail establishments may be capable of handling cash back transactions of $100 or less.

Accordingly, if the POS computing system 104 and/or the provider computing system 102 determines that the cash back amount is less than the cash back threshold, the employee or worker of the POS location may provide the customer with cash back instantly from the payment terminal 132, at step 210.

Alternatively, if the cash back amount is more than the cash back threshold, the provider computing system 102 may create an authentication passcode, at step 212. If the POS computing system 104 determines that the cash back amount is above the cash back threshold, the POS computing system 104 may then transmit the cash back amount and a verified request for ATM-provided cash back to the provider computing system 102. If the provider computing system 102 determines that the cash back amount is above the cash back threshold, or if the provider computing system 102 receives the verified request for ATM-provided cash back, the provider computing system 102 then creates the authentication passcode using the authentication circuit 124.

The provider computing system 102 then transmits the cash back information to the ATM 106, at step 214. For example, the provider computing system 102 may transmit the created authentication passcode and a cash back amount to the ATM 106. Similarly, the authentication passcode is provided to the customer, at step 216. For example, the provider computing system 102 may transmit the authentication passcode to the POS computing system 104 to be provided to the customer. The POS computing system 104 may then transmit the passcode to the customer device 108 (e.g., through a display presented to the customer on the customer device 108 by the customer client application 174, through a text message, through an email, etc.) or provide a physical copy of the passcode (e.g., a printed receipt having the passcode printed thereon).

Alternatively, in some instances, the provider computing system 102 may directly provide the passcode to the customer device 108. For example, similar to the POS computing system 104, the provider computing system 102 may transmit the passcode to the customer device 108 (e.g., through a display presented to the customer on the customer device 108 by the customer client application 174, through a text message, through an email, etc.). In either case, the provider computing system 102 acts as an intermediary computing system between the ATM 106 and the POS computing system 104, such that the POS computing system 104 does not directly communicate with the ATM 106.

Once the passcode has been provided to the customer, the customer then authenticates the cash back transaction at the ATM 106, at step 218. Specifically, the customer may approach the ATM 106 and provide the passcode to the ATM 106 to receive the cash back amount. As alluded to above, the passcode may be a one-time passcode, a bar code, a QR code, a PIN, a time-encoded passcode, or any other suitable passcode capable of authenticating the cash withdrawal at the ATM 106. In some instances, providing the passcode to the ATM 106 may comprise entering the passcode manually (e.g., using a keypad of the ATM 106). In other instances, providing the passcode to the ATM 106 may comprise scanning a scannable barcode (e.g., a QR code) on a printed receipt or a display of the customer client application 174 on the customer device 108 using a scanning device of the ATM 106. In some other instances, the customer device 108 may automatically connect with the ATM 106, provide a prompt to the customer asking whether to authenticate the cash back transaction, and automatically transmit the passcode to the ATM 106 based on the customer's response to the prompt. Once the cash back transaction has been authenticated, the ATM 106 provides the customer with the cash back amount, at step 220.

Accordingly, at no point throughout the method 200 is the customer required to create or have an account associated with the provider. That is, the customer can remain anonymous (or largely anonymous) to the provider. Thus, underbanked individuals wanting to cash large checks may effectively do so using the method 200, while remaining largely anonymous to the provider and avoiding the excessive charges typically applied by check cashing locations.

Figure 3:
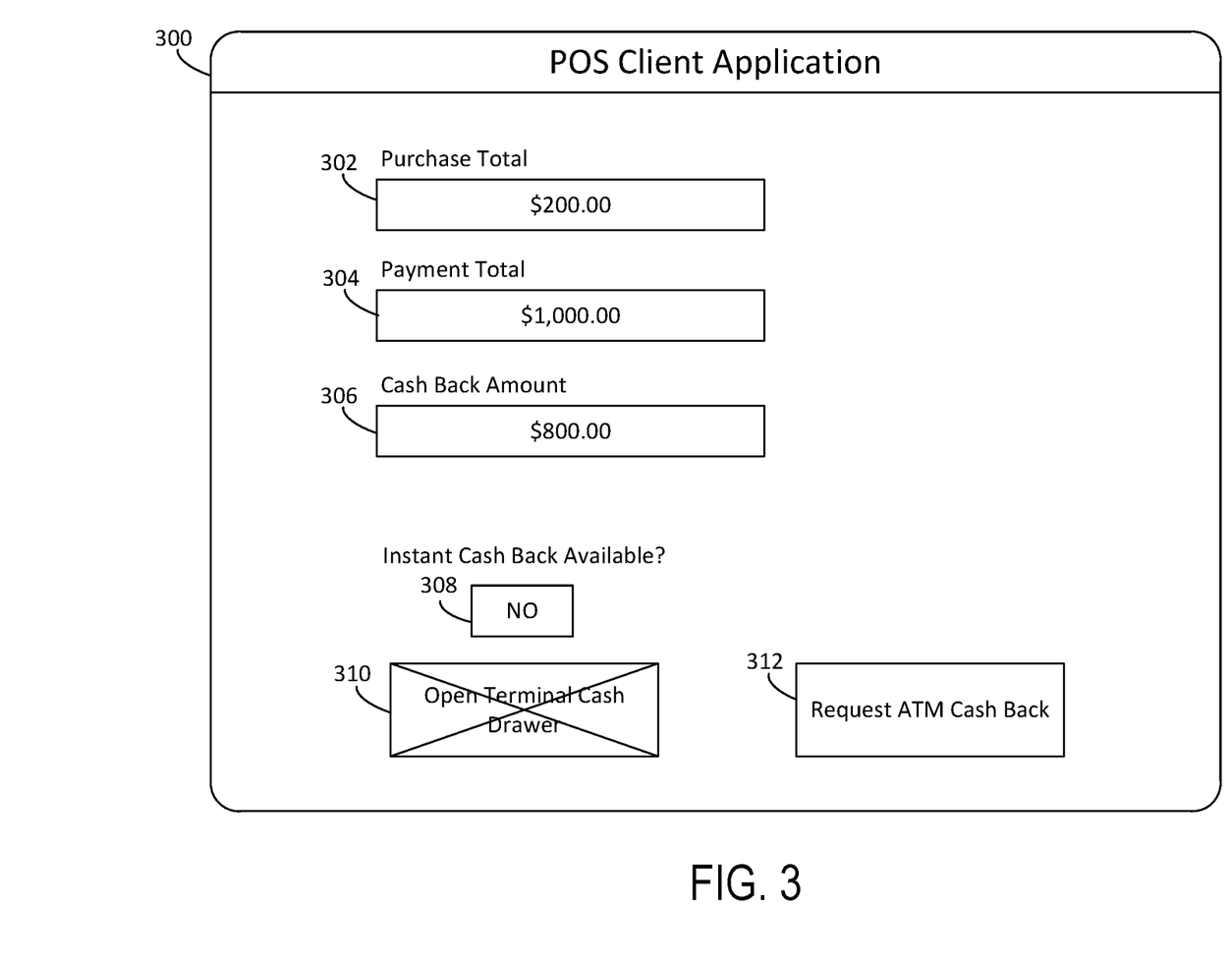
FIG. 3 is a transaction interface provided by a point of sale client application, according to an example embodiment.
Figure 4:
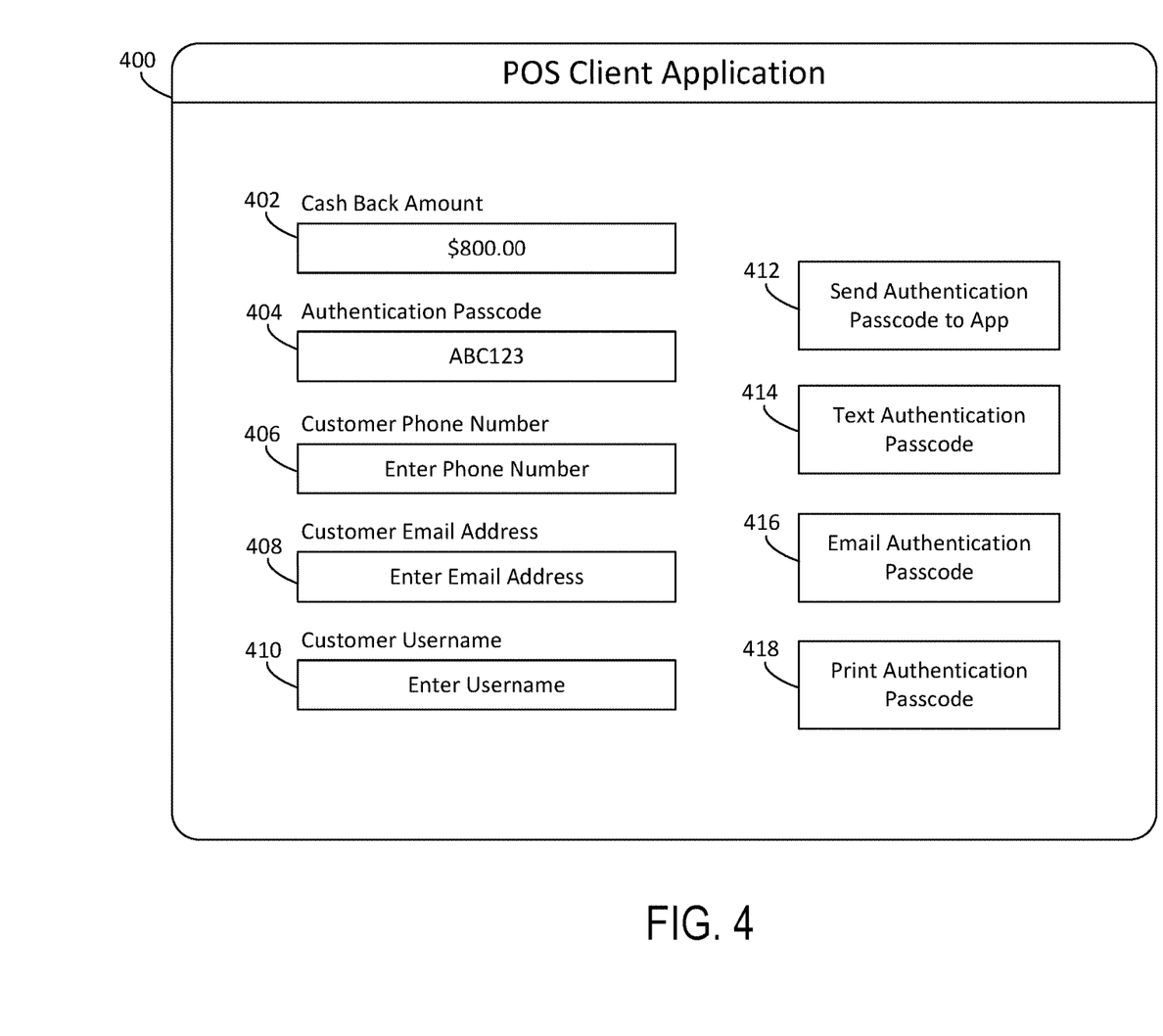
FIG. 4 is a cash back information interface provided by the point of sale client application, according to an example embodiment.

Referring now to FIGS. 3 and 4, graphical user interfaces displayed on the POS computing system 104 via the POS client application 144 are shown, according to example embodiments. Referring now to FIG. 3, an example screenshot of a client application interface of the POS computing system 104 associated with a POS location is shown, according to an example embodiment. The interface 300 is indicative of a transaction interface the worker or employee of the POS location could receive while using the POS client application 144. The interface 300 includes a purchase total entry box 302, a payment total entry box 304, a cash back amount field 306, a terminal cash back indicator 308, a terminal cash back button 310, and an ATM cash back request button 312. The POS worker or employee may use the purchase total entry box 302 and the payment total entry box 304 to enter the purchase total and payment total, respectively. In some instances, if a payment check is scanned into the POS computing system 104, the POS computing system 104 may automatically fill in the payment total entry box 304 using the payment check information obtained from the payment check. Once the purchase total entry box 302 and the payment total entry box 304 are filled in, the cash back amount is determined by the POS computing system 104 and is automatically filled into the cash back amount field 306.

Once the cash back amount has been determined, the POS computing system 104 may then determine whether the cash back amount is above the preset cash back threshold. The terminal cash back indicator 308 may then indicate whether the employee or worker may provide cash back to the customer instantly from the payment terminal 132 based on whether the cash back amount is at or below the cash back threshold. Thus, if the terminal cash back indicator 308 indicates that instant cash back is available, the employee or worker may click on the terminal cash back button 310 to open a terminal cash drawer to provide cash back to the customer. Conversely, if the cash back indicator 308 indicates that instant cash back is not available, the employee or worker may click on the ATM cash back request button 312 to request cash back for the customer from a linked ATM (e.g., the ATM 106). In some instances, as shown in the exemplary embodiment provided in FIG. 3, if instant cash back is not available, the terminal cash back button 310 may be crossed out, grayed out, and/or otherwise made unavailable for clicking by the POS worker or employee. Similarly, if instant cash back is available, the ATM cash back request button 312 may be crossed out, grayed out, and/or otherwise made unavailable for clicking by the POS worker or employee.

Referring now to the FIG. 4, an example screenshot of a client application interface of the POS computing system 104 associated with a POS location is shown, according to an example embodiment. The interface 400 is indicative of a cash back information interface an employee or worker could receive from the POS client application 144. The interface 400 includes a cash back amount field 402, an authentication passcode field 404, a customer phone number entry box 406, a customer email address entry box 408, a customer username entry box 410, an application transmittal button 412, a text button 414, an email button 416, and a print button 418. The cash back amount field 402 displays the cash back owed to the customer. The authentication passcode field 404 displays the authentication passcode to the POS employee or worker. Accordingly, in some instances, the POS employee or worker may simply verbally provide the authentication passcode to the customer.

In some instances, the POS employee or worker may choose to have the POS computing system 104 send the authentication passcode via text message, email message, and/or via the client application (e.g., from the POS client application 144 to the customer client application 174). Accordingly, the POS employee or worker may verbally receive and enter the customer's phone number, email address, and/or username (e.g., a username associated with the customer's account and the customer client application 174) into the customer phone number entry box 406, the customer email address entry box 408, and/or the customer username entry box 410, respectively. The POS employee or worker may then select to send the authentication passcode to the customer client application 174, to text the authentication passcode to the customer (e.g., to the customer's cell phone or, in some instances, the customer device 108), and/or to email the authentication passcode to the customer using the application transmittal button 412, the text button 414, and/or the email button 416, respectively. Alternatively, the POS employee or worker may choose to print the authentication passcode out using the print button 418. For example, the print button 418 may cause a printing machine associated with the POS computing system 104 to print the authentication passcode on a receipt for the customer's purchase transaction, or it may cause the printing machine to print a separate copy of the authentication passcode.

Those of skill in the art will appreciate that FIGS. 3 and 4 are meant to be illustrative rather than limiting. For example, in other embodiments, the interfaces are configured differently, such as including different entry boxes, different notifications, a different order, a different arrangement, or different options generally. As one example, the POS location may not be configured to provide cash back in any amount. Accordingly, the transaction interface shown in FIG. 3 may not include the terminal cash back indicator 308 and/or the terminal cash back button 310. Additionally, in some instances, as described above, the authentication passcode may be a scannable passcode. Accordingly, in these instances, the cash back information interface shown in FIG. 4 may not include the authentication passcode, and the authentication passcode may be sent directly to the customer in the manners described above. Additionally, it will be understood that similar interfaces may be provided to the provider computing system 102 via the provider computing system 102 for use by a provider worker or employee.

Figure 5:
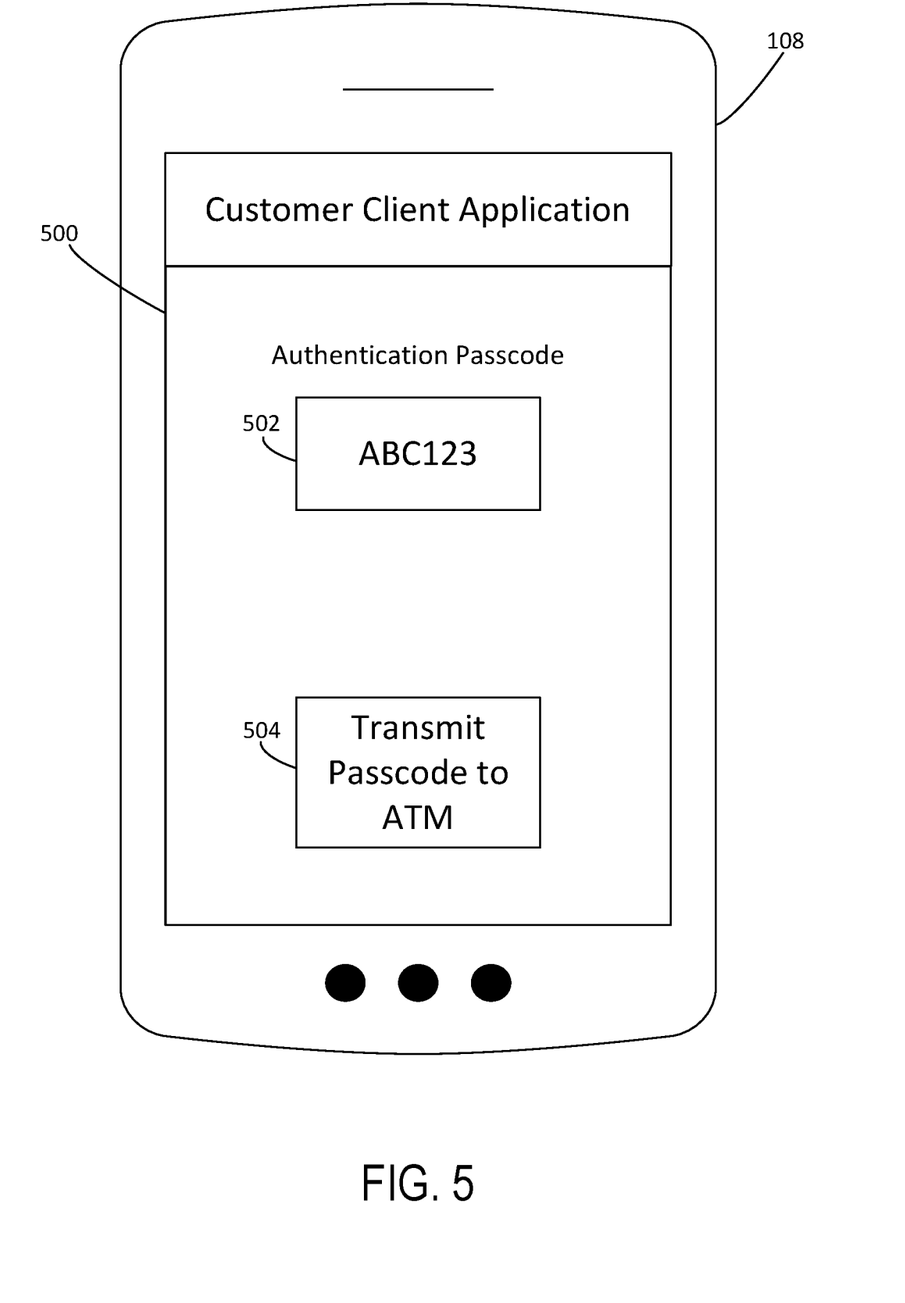
FIG. 5 is an authentication passcode notification interface provided by a customer client application, according to an example embodiment.

Referring now to FIG. 5, a graphical user interface displayed on the customer device 108 via the customer client application 174 is shown, according to an example embodiment. Specifically, an example screenshot of a client application interface is shown. The interface 500 is indicative of an authentication passcode notification interface a customer could receive from the customer client application 174. The interface 500 includes an authentication passcode field 502 and an ATM passcode transmission button 504. The authentication passcode field 502 is configured to display the authentication passcode to the customer. Although the authentication passcode is shown as an alphanumeric passcode in the illustrative example provided in FIG. 5, it will be understood that any of the various passcode types described herein may be displayed in the authentication passcode field 502. For example, as described herein, the authentication passcode may instead be a scannable passcode (e.g., a bar code or a QR code). The ATM passcode transmission button 504 is configured to selectively transmit the authentication passcode to the ATM 106. As such, when the customer device 108 and the ATM 106 are configured to connect via RFID or NFC logic, the customer may click on the ATM passcode transmission button 504 once the customer device 108 is connected to the ATM 106 to transmit the authentication passcode. In some instances, the ATM passcode transmission button 504 may be crossed out, grayed out, or otherwise made unavailable for clicking by the customer when the customer device 108 is not connected with or in range of the ATM 106.

Furthermore, similar to FIGS. 3 and 4 described above, those of skill in the art will appreciate that FIG. 5 is meant to be illustrative, rather than limiting. For example, in other embodiments, the interface is configured different, such as including different entry boxes, different notifications, a different order, a different arrangement, or different options generally.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for providing cash back to a customer from a linked automated teller machine (ATM) after a purchase transaction, the method comprising:
   receiving, by a provider computing system associated with a provider, a cash back request including a cash back amount from a point of sale computing system associated with the purchase transaction, the provider computing system acting as an intermediary computing system between the point of sale computing system and the linked ATM;
   in response to receiving the cash back request, creating, by the provider computing system, an authentication passcode;
   transmitting, by the provider computing system, cash back information to the linked ATM, the cash back information including the cash back amount and the authentication passcode;
   in response to entry of the authentication passcode into the linked ATM by the customer, authenticating, by the linked ATM, a cash back transaction by comparing the authentication passcode received from the provider computing system with the authentication passcode entered by the customer; and in response to authenticating the cash back transaction, providing, by the linked ATM, the cash back amount to the customer.

2. The method of claim 1, wherein the authentication passcode is one of a scannable passcode and an alphanumeric passcode.

3. The method of claim 1, wherein providing the authentication passcode to the customer comprises:
transmitting, by the provider computing system, the authentication passcode to the point of sale computing system;
printing, by the point of sale computing system, the authentication passcode; and
providing the printed authentication passcode to the customer.

4. The method of claim 1, further comprising transmitting, by the provider computing system, the authentication passcode to a customer device associated with the customer.

5. The method of claim 1, further comprising:
initiating the purchase transaction using a payment check; and
verifying, by the provider computing system, the payment check based on payment check information pertaining to the payment check.

6. The method of claim 5, wherein the payment check information is obtained from a digital image of the payment check.

7. The method of claim 5, wherein verifying the payment check comprises transmitting the payment check information to a third party service provider.

8. The method of claim 5, wherein the provider associated with the provider computing system is an issuer of the payment check and verifying the payment check comprises comparing the payment check information with account information stored within an accounts database of the provider computing system.

9. A method for providing cash back to a customer from a linked automated teller machine (ATM) after a purchase transaction at a point of sale location, the method comprising:
receiving, by a provider computing system associated with a provider, a cash back request including a cash back amount from a point of sale computing system associated with the purchase transaction, the provider computing system acting as an intermediary computing system between the point of sale computing system and the linked ATM;
determining, by the provider computing system, that the cash back amount is above a cash back threshold;
in response to determining that the cash back amount is above the cash back threshold, the method further comprising:
creating, by the provider computing system, an authentication passcode;
transmitting, by the provider computing system, cash back information to the linked ATM, the cash back information including the cash back amount and the authentication passcode;
in response to entry of the authentication passcode into the linked ATM by the customer, authenticating, by the linked ATM, a cash back transaction by comparing the authentication passcode received from the provider computing system with the authentication passcode entered by the customer; and
in response to authenticating the cash back transaction, providing, by the linked ATM, the cash back amount to the customer.

10. The method of claim 9, further comprising transmitting, by the provider computing system, the authentication passcode to a customer device associated with the customer.

11. The method of claim 9, further comprising:
initiating the purchase transaction using a payment check; and
verifying the payment check via a third party interface circuit.

12. The method of claim 9, wherein the authentication passcode is one of a scannable passcode and an alphanumeric passcode.

13. The method of claim 9, further comprising:
transmitting, by the provider computing system, the authentication passcode to the point of sale computing system associated with the purchase transaction.

14. The method of claim 13, further comprising:
printing, by the point of sale computing system, the authentication passcode; and
providing the printed authentication passcode to the customer.

15. A linked automated teller machine (ATM) system comprising:
a network;
a provider computing system associated with a provider comprising:
a provider network interface structured to facilitate data communication via the network; and
a provider processing circuit comprising a provider processor and a provider memory, the provider processing circuit structured to:
receive a cash back request including a cash back amount from a point of sale computing system associated with a purchase transaction via the network, the provider computing system acting as an intermediary computing system between the point of sale computing system and a linked ATM associated with the provider;
in response to receiving the cash back request, create an authentication passcode; and
transmit the authentication passcode and the cash back amount to the linked ATM associated with the provider via the network; and
the linked ATM comprising:
an ATM network interface structured to facilitate data communication via the network; and
an ATM processing circuit comprising an ATM processor and an ATM memory, the ATM processing circuit structured to:
in response to entry of the authentication passcode into the linked ATM by a customer, authenticate a cash back transaction by comparing the authentication passcode received from the provider computing system with the authentication passcode entered by the customer; and
in response to authenticating the cash back transaction, provide the cash back amount to the customer.

16. The linked ATM system of claim 15, wherein the cash back request further includes a digital image of a payment check associated with the cash back request and the provider processing circuit is further structured to:
obtain payment check information pertaining to the payment check from the digital image of the payment check; and verify the payment check based on the payment check information.

17. The linked ATM system of claim 15, wherein the authentication passcode is one of a scannable passcode and an alphanumeric passcode.

18. The linked ATM system of claim 15, wherein the provider processing circuit is further structured to transmit the authentication passcode to a customer device associated with the customer.

19. The linked ATM system of claim 15, wherein the cash back request further includes payment check information pertaining to a payment check and the provider processing circuit is further structured to:
   verify the payment check based on the payment check information.

20. The linked ATM system of claim 19, wherein verifying the payment check comprises transmitting the payment check information to a third party service provider.

\* \* \* \* \*